(12) United States Patent
Walz et al.

(10) Patent No.: US 9,687,912 B2
(45) Date of Patent: Jun. 27, 2017

(54) TOOL CARRIER AND MACHINE TOOL HAVING A TOOL CARRIER

(75) Inventors: Jürgen Walz, Frickenhausen (DE); Franco Rigolone, Ponteranica (IT); Gottfried Deuringer, Geretsried (DE); Renato Rota, Carvico (IT); Manuel Gerst, Bielefeld (DE)

(73) Assignee: GILDEMEISTER Italiana S.p.A., Brembate di Sopra (IT)

( * ) Notice: Subject to any disclaimer, the term of this patent is extended or adjusted under 35 U.S.C. 154(b) by 814 days.

(21) Appl. No.: 14/122,651

(22) PCT Filed: May 18, 2012

(86) PCT No.: PCT/EP2012/059282
§ 371 (c)(1),
(2), (4) Date: May 22, 2014

(87) PCT Pub. No.: WO2012/163697
PCT Pub. Date: Dec. 6, 2012

(65) Prior Publication Data
US 2014/0318331 A1 Oct. 30, 2014

(30) Foreign Application Priority Data
May 31, 2011 (DE) .......................... 10 2011 076 835

(51) Int. Cl.
*B23B 3/00* (2006.01)
*B23B 3/16* (2006.01)
(Continued)

(52) U.S. Cl.
CPC ................ *B23B 3/16* (2013.01); *B23B 3/165* (2013.01); *B23B 3/168* (2013.01); *B23B 3/30* (2013.01);
(Continued)

(58) Field of Classification Search
CPC ..... B23B 29/32; B23B 29/323; B23B 29/326; B23B 29/242; B23B 3/16; B23B 29/28;
(Continued)

(56) References Cited

U.S. PATENT DOCUMENTS 4,080,853 A   3/1978 Goto
5,127,140 A * 7/1992 Oiwa ...................... B23B 3/167
                                                       29/27 C (Continued)

FOREIGN PATENT DOCUMENTS

DE           279 429 A1    6/1990
DE       195 28 404 A1    2/1997
(Continued)

OTHER PUBLICATIONS

DE 10 2011 076 837.8—German Examination Report with English translation, dated Jun. 12, 2012, 13 pages.

(Continued)

*Primary Examiner* — Will Fridie, Jr.
(74) *Attorney, Agent, or Firm* — Blakely Sokoloff Taylor & Zafman LLP

(57) ABSTRACT

The present invention relates to a tool carrier 62 for a machine tool, in particular a lathe, having a rotary shaft drive for a numerically controllable rotary shaft B for rotating the tool carrier 62, a first tool turret head 62A carrying tools, rotatably mounted around a first turret axis, and a second tool turret head 62B carrying tools, rotatably mounted around a second turret axis, the first tool turret head 62A and the second tool turret head 62B being positioned on opposite sides of the tool carrier 62 with respect to the axis of rotation of the rotary shaft B. The present invention also relates to a machine tool, in particular a lathe, having a tool carrier 62 of this type.

16 Claims, 11 Drawing Sheets

(51) Int. Cl.
*B23B 3/30* (2006.01)
*B23Q 39/02* (2006.01)

(52) U.S. Cl.
CPC ......... *B23Q 39/026* (2013.01); *B23Q 39/027* (2013.01); *Y10T 29/5153* (2015.01); *Y10T 82/2506* (2015.01)

(58) Field of Classification Search
CPC ............... B23B 29/282; B23B 29/287; B23Q 2039/004
See application file for complete search history.

(56) References Cited

U.S. PATENT DOCUMENTS

| | | | |
|---|---|---|---|
| 5,490,307 A | 2/1996 | Link | |
| 5,704,262 A | 1/1998 | Baumbusch et al. | |
| 6,626,075 B2* | 9/2003 | Hirose | B23B 3/168 82/118 |
| 6,640,677 B2 | 11/2003 | Ueda et al. | |
| 6,742,422 B1 | 6/2004 | Shinohara et al. | |
| 6,758,117 B2* | 7/2004 | Baumann | B23Q 39/026 29/36 |
| 6,810,664 B1 | 11/2004 | Lorenc | |
| 6,948,411 B2* | 9/2005 | Grossmann | B23Q 39/048 82/117 |
| 7,039,992 B2 | 5/2006 | Tokuma et al. | |
| 7,266,871 B2 | 9/2007 | Takeuchi et al. | |
| 7,451,533 B2 | 11/2008 | Kawasumi et al. | |
| 7,987,567 B2* | 8/2011 | Yasuda | B23B 3/065 29/27 C |
| 8,224,477 B2* | 7/2012 | Matsumoto | B23Q 39/04 29/27 C |
| 8,297,158 B2* | 10/2012 | Watanabe | B23B 3/165 29/27 R |
| 8,887,360 B2 | 11/2014 | Fukuoka et al. | |
| 9,126,266 B2* | 9/2015 | Walz | B23B 3/168 |
| 2001/0032532 A1 | 10/2001 | Hafla et al. | |
| 2007/0283545 A1 | 12/2007 | Langerfeld | |
| 2008/0066592 A1 | 3/2008 | Yamane et al. | |
| 2008/0202297 A1 | 8/2008 | Hirose | |
| 2011/0137452 A1* | 6/2011 | Boyes | B23B 3/165 700/213 |
| 2014/0251097 A1* | 9/2014 | Walz | B23B 3/168 82/121 |

FOREIGN PATENT DOCUMENTS

| | | |
|---|---|---|
| DE | 19 959 961 A1 | 6/2001 |
| DE | 10 116 994 A1 | 10/2002 |
| DE | 10 2006 015 078 A1 | 11/2006 |
| DE | 10 2006 013 783 A1 | 12/2006 |
| DE | 10 2006 026 184 A1 | 12/2007 |
| DE | 10 2011 076 834 | 12/2012 |
| EP | 0 999 002 A1 | 5/2000 |
| EP | 1 160 052 A1 | 12/2001 |
| EP | 1 897 640 A1 | 3/2008 |
| EP | 2 058 071 A1 | 5/2009 |

OTHER PUBLICATIONS

PCT/EP2012/059287; International Search Report and English translation of Written Opinion, mail date Aug. 10, 2012, 19 pages.
PCT/EP2012/059287; English translation of International Preliminary Report on Patentability, issued Dec. 2, 2013, 12 pages.
DE 10 2011 076 835.1—German Office Action with English translation, issued Jun. 12, 2012, 11 pages.
DE 10 2011 076 834.3—German Office Action with English translation, issued Jun. 14, 2012, 11 pages.
DE 10 2011 077 571.4—German Examination Report with English translation, dated Jun. 15, 2012, 8 pages.
PCT/EP2012/059282; English translation of International Preliminary Report on Patentability, issued Dec. 2, 2013, 6 pages.
PCT/EP2012/059284; English translation of International Preliminary Report on Patentability, issued Dec. 2, 2013, 9 pages.
PCT/EP2012/059292; English translation of International Preliminary Report on Patentability, issued Dec. 2, 2013, 11 pages.

* cited by examiner

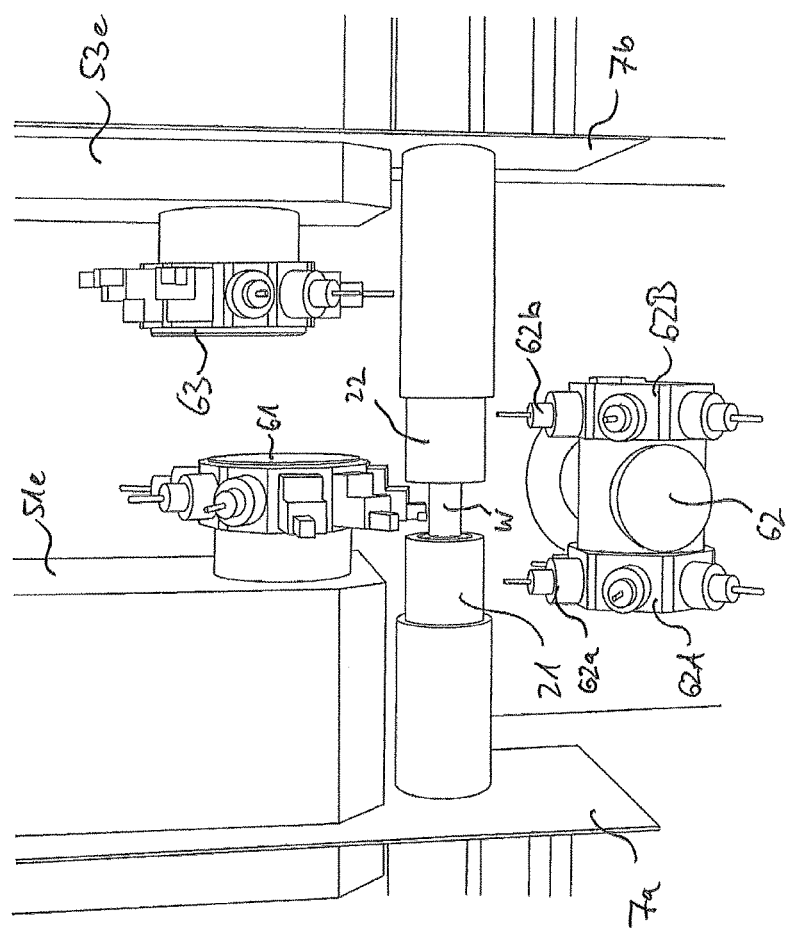

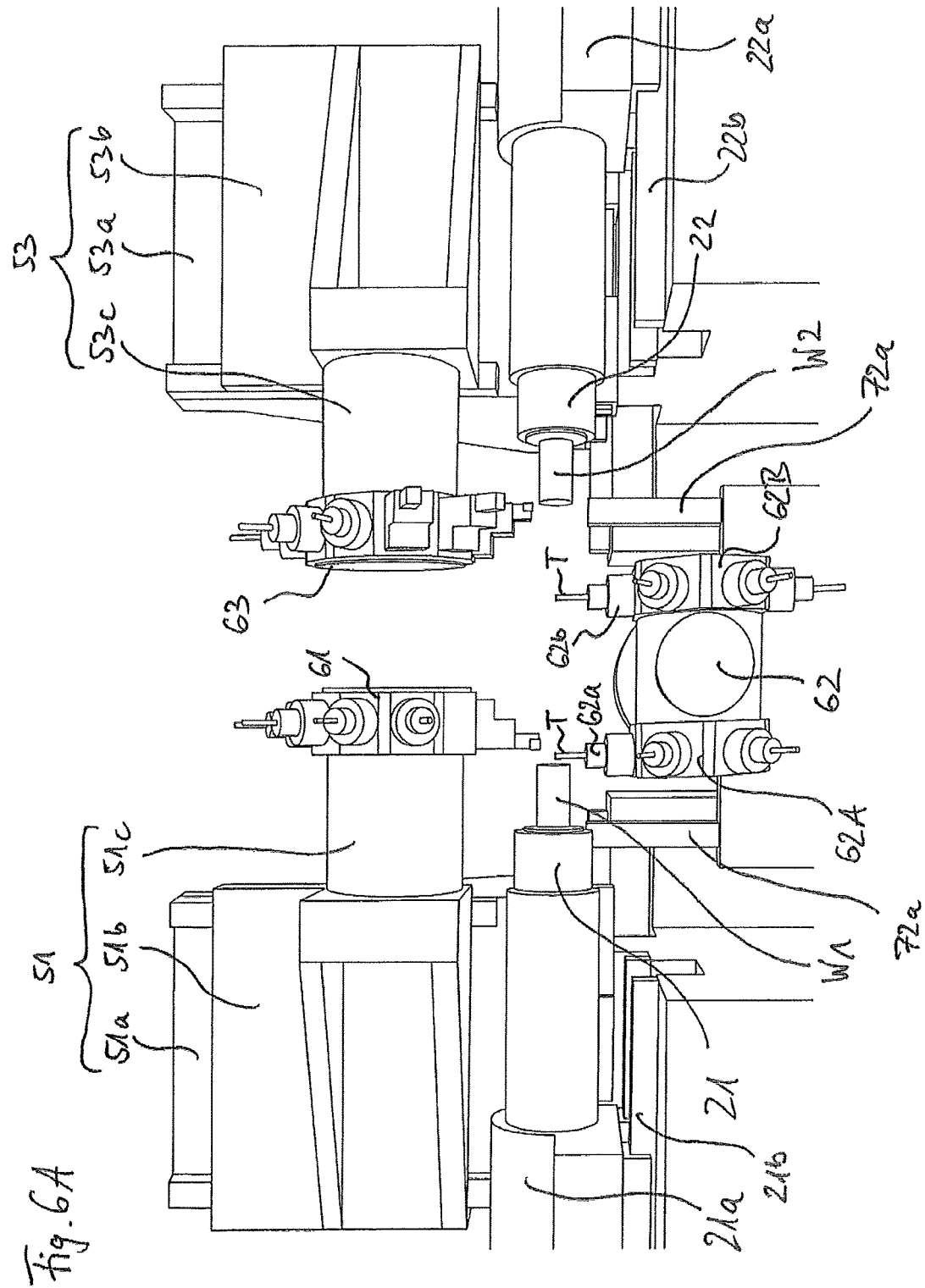

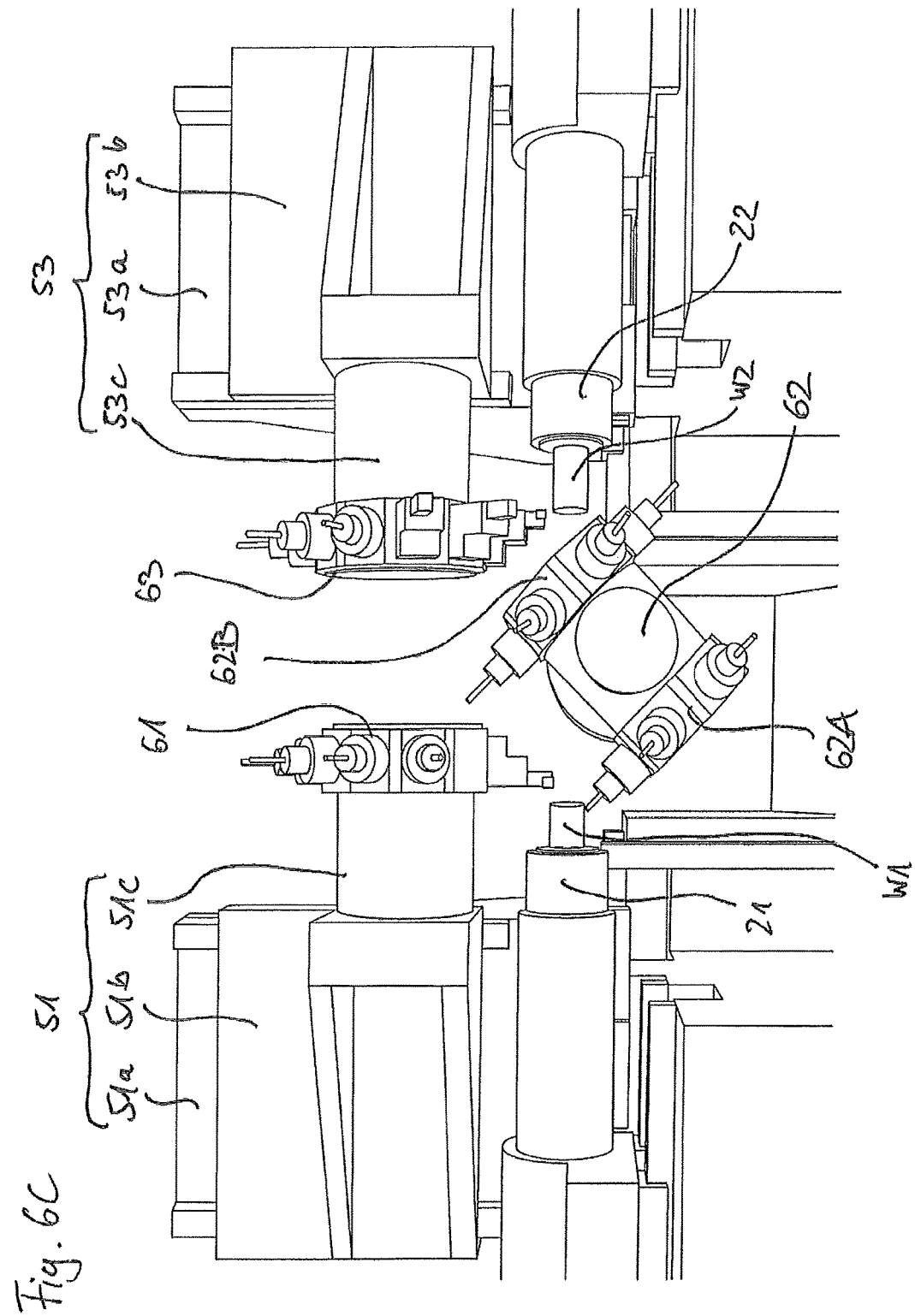

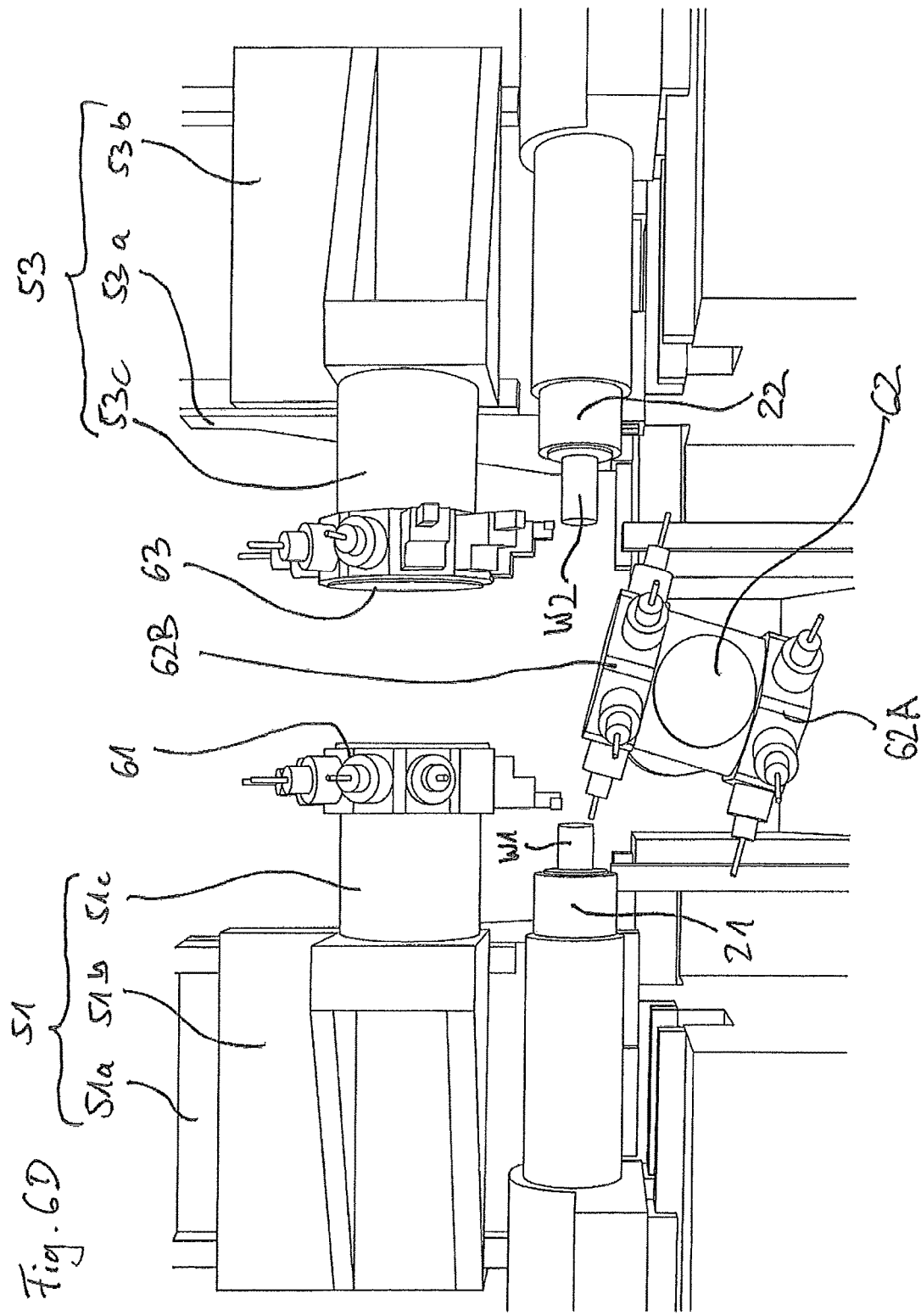

TOOL CARRIER AND MACHINE TOOL HAVING A TOOL CARRIER

CROSS-REFERENCE TO RELATED APPLICATIONS

This application is the U.S. National Stage entry under 35 U.S.C. §371 of international application PCT/EP2012/059282, filed 18 May 2012, which in turn claims priority to German patent application DE 10 2011 076 835.1, filed 31 May 2011.

The present invention relates to a tool carrier for a machine tool, in particular a lathe, having a tool turret head carrying tools, rotatably mounted around a first turret axis. The present invention also relates to a machine tool, in particular a lathe, having a tool carrier of this type.

BACKGROUND OF THE INVENTION

Generic machine tools having generic tool carriers comprise a machine frame, on which a work spindle or even two mutually facing work spindles having parallel or coaxial spindle axes may be provided, it being possible to receive workpieces, to be machined on the machine tool, on each of the work spindles. To prepare the tools for machining, one or more tool carriers are usually supplied, said tool carriers being provided on tool slides, in particular compound slides, arranged on the machine frame and which can be displaced relative to the work spindles by means of one or more linear shafts (for example being displaceable in the X, Y or Z direction). Generic machine tools of this type are known for example from DD 279 429 AI or EP 0 999 002 A1.

In general, in generic machine tools of this type, there is a requirement to provide the machine tool in such a way that it is possible to machine the workpieces efficiently with as many tools as possible, which have the maximum capacity for simultaneous use, with the maximum possible flexibility in the control of the relative movements between the tools and the tools received in the work spindles, together with a compact and cost-effective construction of the machine tool.

The object of the invention is thus to improve a tool carrier for a machine tool or a machine tool of the generic type in such a way that it is possible to machine the workpieces efficiently with as many tools as possible, which have the maximum capacity for simultaneous use, with the maximum possible flexibility in the control of the relative movements between the tools and the tools received in the work spindles, together with a compact and cost-effective construction of the machine tool and a machining space which the machinist or operator of the machine tool can see into as easily possible.

SUMMARY OF THE INVENTION

To achieve the stated object, the present invention proposes a tool carrier for a machine tool according to independent claim 1 and a machine tool according to claim 6. The dependent claims relate to preferred embodiments according to the present invention.

In this context, the invention is based on the concept of providing a tool carrier having a numerically controllable rotary shaft on which two tool turrets located on opposite sides of the tool carrier relative to the axis of rotation of the rotary shaft are supplied. The tool carrier can be rotated by means of the rotatably controllable rotary shaft such that tools from the first tool turret can be aligned with a work spindle of the machine tool and tools from the second tool turret can also be aligned with the work spindle of the machine tool. Thus, a large number of tools which can be used flexibly are already provided on the machine tool by means of a single tool carrier.

It is also possible and particularly advantageous to provide a tool carrier according to the invention on twin-spindle lathes which comprise two mutually facing work spindles arranged in parallel or coaxially such that, by rotating the tool carrier by means of the rotary shaft, not only are configurations possible in which workpieces can be machined on both work spindles simultaneously with the tools opposite each other on one of the two tool turrets of the tool carrier, but also configurations in which workpieces can be machined on both work spindles simultaneously by a respective tool from the respective first tool turret or second tool turret. As a result, with a tool carrier according to the invention, it is advantageously possible to provide a large number of different machining options with a large number of different tools in a very compact design by means of only one tool carrier.

According to the invention, based on the inventive concept described above, a tool carrier for a machine tool, in particular a lathe, is proposed, said tool carrier comprising a numerically controllable rotary shaft for rotating the tool carrier, a first tool turret head carrying tools, rotatably mounted around a first turret axis and a second tool turret head carrying tools, rotatably mounted around a second turret axis. According to the invention it is also proposed that the first tool turret head and the second tool turret head be located on opposite sides of the tool carrier with respect to the axis of rotation of the rotary shaft.

The tool carrier according to the invention thus permits efficient machining of workpieces with as many tools as possible, which have the maximum capacity for simultaneous use in the maximum number of different configurations, since a tool carrier is provided in a compact manner having two advantageously arranged tool turrets for machining workpieces on the work spindle(s), permitting extremely high flexibility in the control of the relative movements between the tools and the tools received in the work spindles, as a result of possible tool slides which can be controlled separately.

Preferred embodiments of the present invention are described below. These embodiments can be manufactured individually or in combination in order to create further preferred embodiments of the present invention.

The first turret axis is preferably aligned in parallel, in particular coaxial, with the second turret axis. The tool carrier can thus advantageously be designed to be even more compact and permits further improvements to flexibility in the control of the relative movements between the tools and the tools received in the work spindles.

The first turret axis of the first tool turret head and/or the second turret axis of the second tool turret head are preferably aligned transverse, in particular perpendicular, to the axis of rotation of the rotary shaft. This improves the tool provision or tool alignment capabilities of the tool carrier significantly, as the orientation of the first or second turret axis can then be changed continuously by rotating the tool carrier by means of the rotary shaft. This thus makes it possible to provide a further improvement to flexibility in the control of the relative movements between the tools and the tools received in the work spindles.

In a particularly expedient preferred embodiment, the tool carrier also comprises a numerically controllable linear shaft for moving the first and second turret heads in a direction parallel to the axis of rotation of the rotary shaft. In this case the linear shaft is preferably constructed as a telescopic linear shaft to permit a particularly simple and compact construction. The linear shaft can thus be provided in an extremely compact manner to permit further improvements to flexibility in the control of the relative movements between the tools and the tools received in the work spindles.

The tool carrier preferably also comprises a drive housing in which a rotary shaft drive and/or an optional linear shaft drive are located. The construction can thus be designed even more compactly, especially if the rotary shaft drive and the optional linear shaft drive are contained in one housing.

According to a particularly expedient preferred embodiment, the first tool turret head is formed as a radial turret head, mounts for tools or tool holders preferably being arranged on the circumference on the first tool turret head, and/or the second tool turret head being preferably formed as a radial turret head, mounts for tools or tool holders preferably being arranged on the circumference on the second tool turret head. This has the advantage that the tools can be aligned radially, axially and also obliquely with the workpiece mounts of the work spindles or with the spindle axes thanks to the radial arrangement of the mounts for receiving tools or the tool holders carrying tools by rotating around the turret axis depending on the orientation of the turret axis.

According to a further aspect of the present invention, a machine tool, in particular a lathe, is also proposed which comprises a first tool carrier according to one of the embodiments described above.

The machine tool preferably comprises a machine frame and a first work spindle arranged on the machine frame for receiving a first workpiece. The first tool carrier is preferably arranged on the machine frame and is preferably set up to align a tool held in the tool carrier with a first workpiece received on the first work spindle in order to machine the workpiece.

The rotary shaft of the first tool carrier is preferably aligned transverse, in particular perpendicular, to the spindle axis of the first work spindle. The turret axes of the first and second tool turret heads can then preferably be aligned by rotating the first tool carrier around the rotary shaft transverse to the spindle axis of the first work spindle. The turret axes of the first and second tool turret heads can then also preferably be aligned by rotating the first tool carrier around the rotary shaft in parallel with the spindle axis of the first work spindle. In particular, the turret axes of the first and second tool turret heads can preferably be aligned by rotating the first tool carrier around the rotary shaft at any angle to the spindle axis of the first work spindle.

According to a particularly expedient embodiment, the machine tool also comprises a first tool carrier slide on the machine frame, the first tool carrier being arranged on said slide. The first tool carrier slide can in this case preferably be displaced in a first direction transverse, in particular perpendicular, to the spindle axis of the first work spindle.

According to a further particularly expedient embodiment, the machine tool also comprises a second work spindle facing the first work spindle and arranged on the machine frame for receiving a second workpiece, the spindle axis of the second work spindle preferably being aligned in parallel to, in particular coaxial with, the spindle axis of the first work spindle. The first tool carrier is in this case preferably arranged between the first work spindle and the second work spindle. The machine tool can thus advantageously be designed to be significantly more compact.

The first tool turret head preferably comprises a plurality of mounts for receiving tools or tool holders holding tools, the first tool carrier preferably being set up to align a mount for the first tool turret head by rotating the first tool turret head around the first turret axis with a workpiece received on one of the work spindles. In this context, the mounts are in each case preferably arranged in pairs on opposite sides on the first tool turret head with respect to the first turret axis, preferably such that one mount can be aligned with the second work spindle in each case, another opposite mount being aligned with the first work spindle when the first turret axis is aligned transverse, in particular perpendicular, to the spindle axes. This thus makes it possible to provide a further significant improvement to flexibility in the control of the relative movements between the tools and the tools received in the work spindles.

The second tool turret head preferably comprises a plurality of mounts for receiving tools or tool holders holding tools, the first tool carrier preferably being set up to align a mount for the second tool turret head with a workpiece received on one of the work spindles by rotating the second tool turret head around the second turret axis. In this context, the mounts are in each case preferably arranged in pairs on opposite sides on the second tool turret head with respect to the second turret axis, preferably such that one mount can be aligned with the first work spindle in each case, another opposite mount being aligned with the second work spindle when the second turret axis is aligned transverse, in particular perpendicular, to the spindle axes. This thus makes it possible to provide a further significant improvement to flexibility in the control of the relative movements between the tools and the tools received in the work spindles.

A mount for the first tool turret head can preferably be aligned in particular with a workpiece received on the first work spindle by aligning a mount for the second tool turret head with a workpiece received on the second work spindle, if at least one of the first and second turret axes is aligned in parallel with the spindle axes. This thus makes it possible to provide a further significant improvement to flexibility in the control of the relative movements between the tools and the tools received in the work spindles.

The machine frame preferably comprises a first carrier portion having a first tool carrier face, comprising a second carrier portion having a second tool carrier face and comprising a central portion arranged between the first and the second carrier portion and having a third tool carrier face. The first tool carrier face of the first carrier portion and the second tool carrier face of the second carrier portion are in this case preferably arranged on the same first face of the machine frame, and the third tool carrier face of the central portion is preferably arranged on a second face of the machine frame, arranged substantially perpendicular or obliquely with respect to the first side of the machine frame. The machine tool can thus advantageously be designed to be significantly more compact.

The first work spindle is preferably arranged on the first carrier portion and the second work spindle is preferably arranged on the second carrier portion. The machine tool can thus advantageously be designed to be significantly more compact.

A first tool carrier slide, which is displaceable transverse to the spindle axes, is preferably arranged on the third tool carrier face of the central portion, the first tool carrier preferably being arranged on the first tool carrier slide. The machine tool can thus advantageously be designed to be significantly more compact.

The central portion preferably comprises a recess between a first and a second guide, a housing for the rotary shaft of the first tool carrier extending into said recess. The machine tool can thus advantageously be designed to be significantly more compact.

The first and/or a second work spindle can preferably be displaced in the direction of the spindle axis. This thus makes it possible to provide a further significant improvement to flexibility in the control of the relative movements between the tools and the tools received in the work spindles.

The machine tool preferably also comprises a second tool carrier slide arranged on the first tool carrier face of the first carrier portion, a second tool carrier being arranged on said second tool carrier slide, and/or a third tool carrier slide arranged on the second tool carrier face of the second carrier portion, a third tool carrier being arranged on said third tool carrier slide. In this case the second and/or third tool carrier slide can preferably be displaced in parallel with or transverse, in particular perpendicular, to the spindle axes. In particular, the second and/or third tool carrier can preferably be displaced in a first direction transverse to the spindle axes, in a second direction transverse to the first direction and transverse to the spindle axes and/or in a third direction parallel with the spindle axes. This thus makes it possible to improve the supply of tools to the machine tool and to provide a further significant improvement to flexibility in the control of the relative movements between the tools and the tools received in the work spindles.

The second and/or third tool carrier is preferably formed as a tool turret, which comprises at least one turret head carrying tools and mounted rotatably around a turret axis aligned in parallel with the spindle axes. The second and/or third tool carrier in further embodiments can of course also be formed as a tool carrier according to the invention having a rotary shaft and two tool turrets which are arranged on opposite sides on the tool carrier with respect to the rotary shaft.

The first tool carrier face of the first carrier portion and the second tool carrier face of the second carrier portion preferably substantially span a first plane, and the third tool carrier face of the central portion preferably substantially spans a second plane aligned perpendicularly or obliquely with respect to the first plane. In this case the second plane is preferably moved towards the machine frame with respect to the second face of the first and second carrier portions of the machine frame.

Thus a machine frame construction or a machine frame structure can be provided in a particularly expedient and compact manner, in which the first tool slide for the first tool carrier can be arranged compactly in a recess or indentation (which may advantageously define a machining space in the machine frame as described above in some cases) between the work spindles or between the carrier portions of the machine frame.

A clearly visible machining space, which is open in the direction of vision or open on one side, can also be created between the carrier portions in a simple and compact manner. If the carrier portions are aligned vertically, the spindle axes being aligned horizontally in this vertical orientation, and the first direction runs substantially vertically between the carrier portions, a particularly expedient collection channel for chips can also be provided beneath the work spindles and the tool carriers in this construction.

To summarise, the present invention makes it possible to improve a tool carrier or a machine tool of the generic type in such a way that it is possible to machine the workpieces efficiently with as many tools as possible, which have the maximum capacity for simultaneous use, with the maximum possible flexibility in the control of the relative movements between the tools and the tools received in the work spindles, with the machine tool simultaneously having a compact construction.

BRIEF DESCRIPTION OF THE FIGURES

FIG. 5 is a further exemplary schematic detail of the machining space of the machine tool in accordance with the preferred embodiment of the present invention from FIG. 2.

FIGS. 6A to 6E are further exemplary schematic details of the machining space of the machine tool in accordance with the preferred embodiment of the present invention from FIG. 2 illustrating how the first tool carrier can be orientated.

DETAILED DESCRIPTION OF PREFERRED EMBODIMENTS OF THE PRESENT INVENTION

Figure 1:
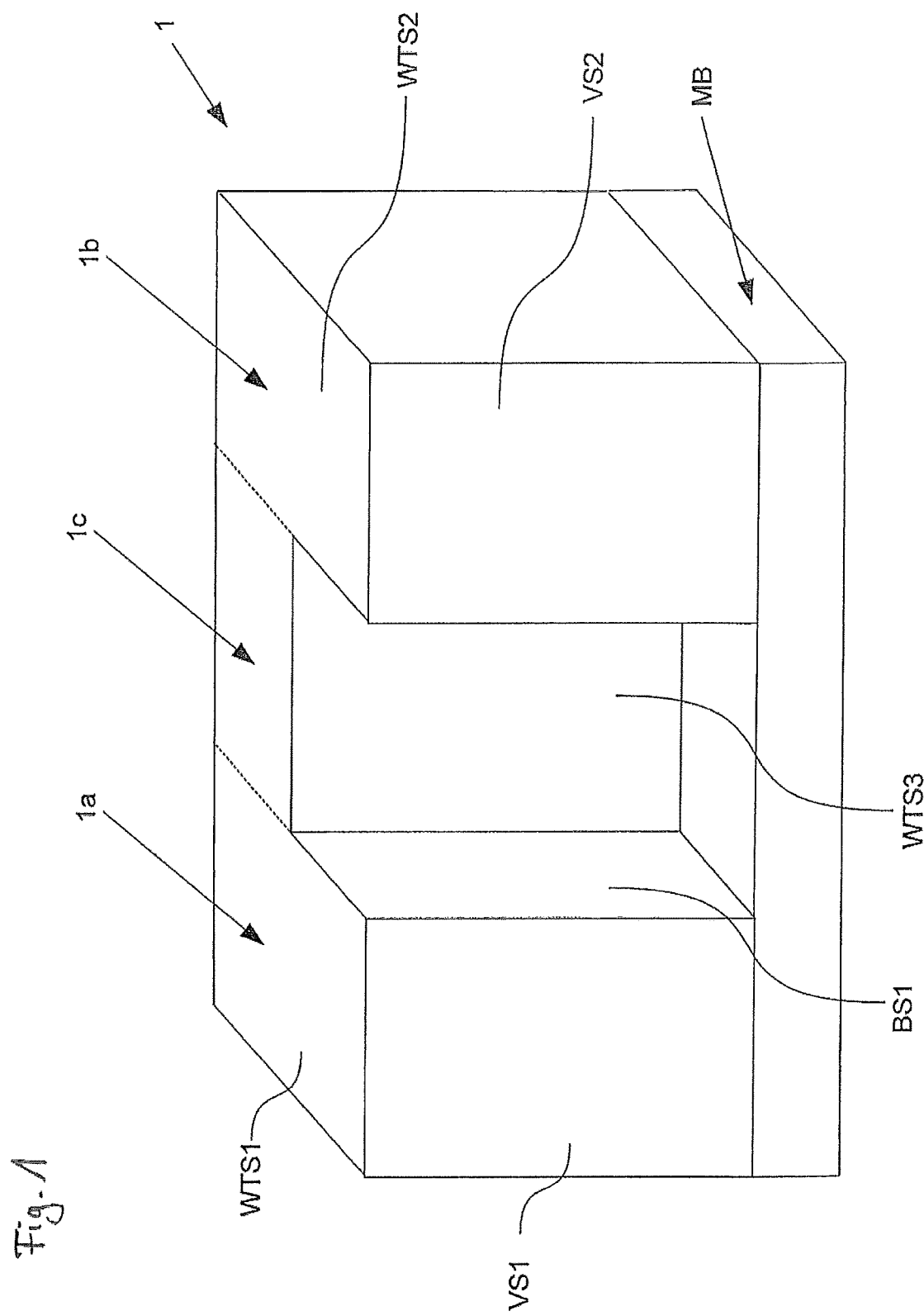
FIG. 1 is an exemplary schematic perspective view of the machine frame structure of a machine tool in accordance with a preferred embodiment for a tool carrier according to the present invention.

In the following, preferred embodiments of the present invention are disclosed in detail referring to the appended drawings. However, the present invention is not limited to the disclosed embodiments. The present invention is defined by the scope of the patent claims. Like or similar features of the embodiments are denoted by like reference numerals in the drawings.

FIG. 1 is an exemplary schematic perspective view of the machine frame structure of the machine tool in accordance with a preferred embodiment. The machine frame 1 comprises a first carrier portion 1a, a second carrier portion 1b and a central portion 1c arranged between the first and the second carrier portion 1a and 1b.

As shown in FIG. 1, the first carrier portion 1a comprises by way of example a first front face VS1 and a first tool carrier face WTS1, which are positioned substantially in mutually perpendicular planes. Analogously to the first carrier portion 1a, the second carrier portion 1b comprises by way of example a second front face VS2 and a second tool carrier face WTS2 which are positioned substantially in mutually perpendicular planes.

According to FIG. 1, the first tool carrier face WTS1 of the first carrier portion 1a and the second tool carrier face WTS2 of the second carrier portion 1b substantially span a first plane, and the first front face VS1 of the first carrier portion 1a and the second front face VS2 of the second carrier portion 1b substantially span a second plane, the first plane being aligned for example substantially perpendicular to the second plane. In other embodiments, the first plane can also be aligned obliquely with respect to the second plane.

In accordance with the embodiment of FIG. 1, the first tool carrier face WTS1 of the first carrier portion 1a and the second tool carrier face WTS2 of the second carrier portion 1b are arranged on the upper face of the machine frame 1, and the first front face VS1 of the first carrier portion 1a and the second front carrier face VS2 of the second carrier portion 1b are arranged on the front face of the machine frame 1. On the lower face, the machine frame comprises a machine base portion MB which comprises a footprint for the machine tool. In other embodiments, the machine frame may also be oriented differently, for example in such a way that the tool carrier faces WTS1 and WTS2 are arranged on the front or rear face of the frame 1.

The central portion 1c, arranged between the carrier portions 1a and 1b, of the machine frame 1 comprises a third tool carrier face WTS3. The third tool carrier face WTS3 of the central portion 1c substantially spans a third plane, which is oriented in parallel with the second plane of the first and second front faces VS1 and VS2, the third plane being indented towards the machine frame 1 with respect to the second plane of the first and second front faces VS1 and VS2, i.e. in particular displaces in a parallel manner towards the machine frame 1.

The first tool carrier face WTS1 of the first carrier portion 1a and the second tool carrier face WTS2 of the second carrier portion 1b are by way of example arranged on the upper face of the machine frame 1, and the first front face VS1 of the first carrier portion 1a, the second front face VS2 of the second carrier portion 1b and the third tool carrier face WTS3 of the central portion 1c are by way of example arranged on the front face of the machine frame 1, from which the machinist looks into the machining space. The machining space is defined in that the central carrier portion 1c is moved towards the machine frame 1, in such a way that a machining space is created which is open towards the front (in a direction transverse to the second plane).

Respective machining space faces BS1 and BS2 (see for example face BS1 in FIG. 1; see also FIG. 2) extend between the first and second front faces VS1 and VS2 of the carrier portions 1a and 1b and the third tool carrier face WTS3 of the central portion 1c and are aligned by way of example perpendicular to the first plane of the first and second tool carrier faces WTS1 and WTS2 of the carrier portions 1a and 1b and transverse, in particular perpendicular, to the second plane of the first and second front faces VS1 and VS2 of the carrier portions 1a and 1b. The machining space faces, together with the third tool carrier face WTS3, define an indentation in the machine frame 1, which can advantageously define the machining space on the machine tool, and additionally, in a vertical orientation as in FIG. 1, a collection channel for chips (also see the embodiment according to FIG. 2).

In this embodiment according to FIG. 1, the carrier portions 1a to 1c are interconnected, but they may also be provided mutually separated in other embodiments of the invention.

Figure 2:
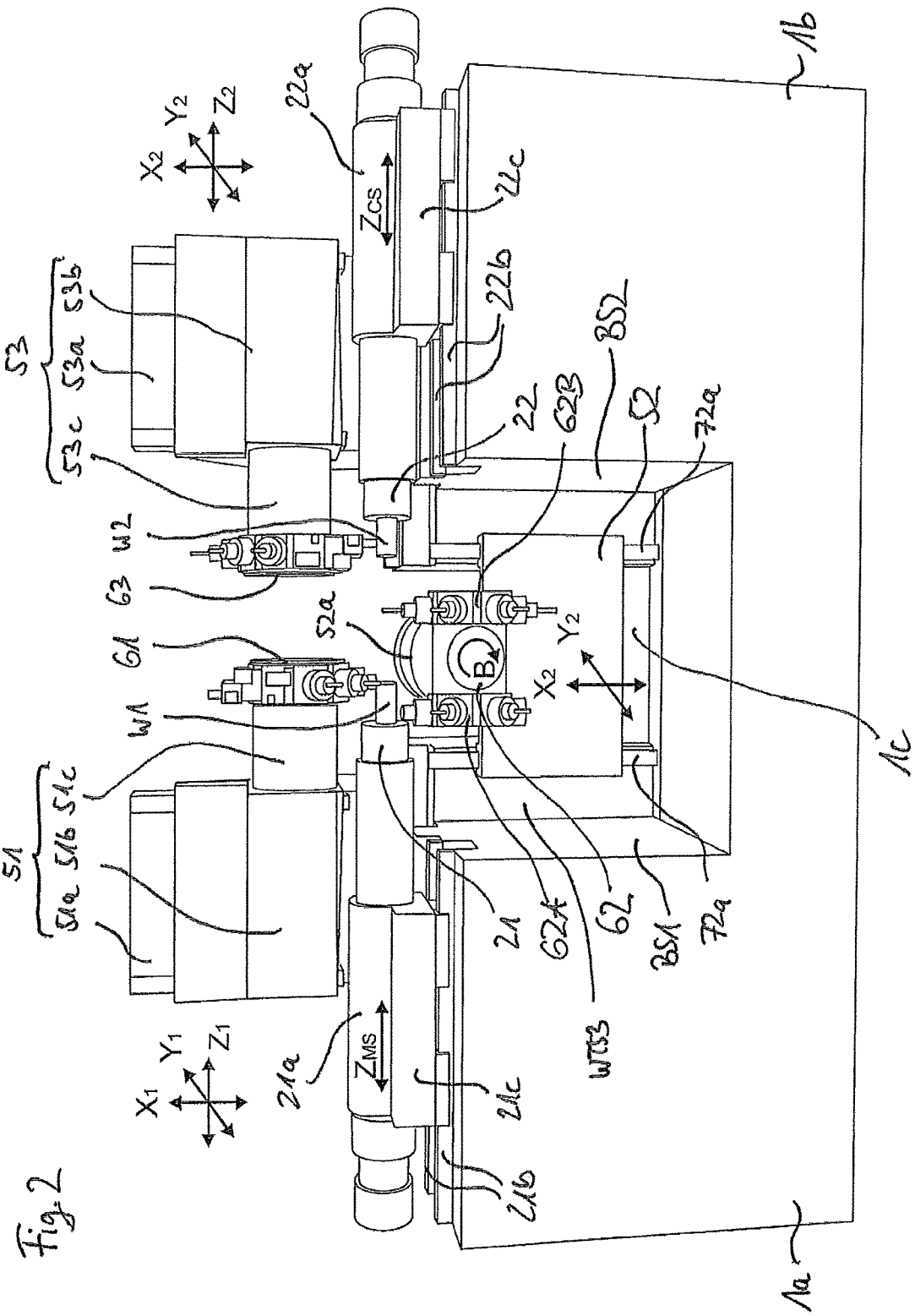
FIG. 2 is an exemplary schematic front view of a machine tool in accordance with a preferred embodiment of the present invention.

FIG. 2 is an exemplary schematic front view of a machine tool according to an embodiment of the present invention. In accordance with this embodiment, work spindles 21 and 22 are by way of example respectively arranged on the tool carrier faces WTS1 and WTS2 of the first and second carrier portions 1a and 1b. The spindles 21 and 22 can, however, also be arranged on the front faces VS1 and VS2 in other embodiments.

The machine tool according to FIG. 2 comprises a first work spindle 21, arranged on the first tool carrier face WTS1 of the first carrier portion 1a and held on a spindle housing 21a, for receiving a first workpiece W1, and a second work spindle 22 facing the first work spindle 21 and arranged on the second tool carrier face WTS2 of the second carrier portion 1b, for receiving a second workpiece W2. The second work spindle 22 is held on a spindle housing 22a.

In this embodiment, the spindle axis of the second work spindle 22 is aligned coaxially with respect to the spindle axis of the first work spindle 21, but it may also be aligned in parallel, but not coaxially, or be aligned in parallel and be able to be aligned coaxially as a result of displacement.

In this embodiment, the first work spindle 21 is arranged in the spindle housing 21a on a spindle slide 21c guided on guides 21b and is displaceable in direction Z ($Z_{MS}$, MS standing for "main spindle") in parallel with the spindle axes, and the second work spindle 22, which is guided in the spindle housing 22a on a spindle slide 22c guided on guides 22b, is also displaceable in direction Z ($Z_{CS}$, CS standing for "counter spindle") in parallel with the spindle axes. In other embodiments, it is also possible for only the first or the second work spindle to be displaced in direction Z.

In this embodiment, the guides 21b and 22b extend by way of example on the first tool carrier face WTS1 of the first carrier portion 1a or on the second tool carrier face WTS2 of the second carrier portion 1b, but alternatively they may also be arranged on the front faces VS1 or VS2 or on projecting portions of the machine frame 1 which may be arranged on the front faces VS1 and VS2 respectively.

According to the invention, in the embodiment shown in FIG. 2, a first tool carrier slide 52 is provided, which is arranged on the third tool carrier face WTS3 of the central section 1c, and on which a first tool carrier 62 is arranged. The first tool carrier slide 52 is displaceable in the vertical direction X2 in FIG. 2 and in particular perpendicular to the spindle axes of the first and second work spindles 21 and 22. For this purpose, guides 72a are arranged on the third tool carrier face WTS3 and are aligned transverse to the spindle axes in the vertical direction X2. By means of a linear shaft (for example in the form of a telescopic shaft), arranged on the first tool carrier slide 52, in a housing 52a, the first tool carrier 62 is also displaceable in a further direction Y2 transverse to the spindle axes and transverse to the direction X2.

In particular, the first tool carrier 62 is formed in such a way that it comprises two tool turrets with respective turret heads 62A and 62B, which are arranged between the first work spindle 21 and the second work spindle 22. Each of the turret heads 62A and 62B is mounted rotatably around a respective turret axis on the tool carrier 62. In this embodiment the turret axes of the turret heads 62A and 62B are by way of example aligned coaxially.

The housing 52a further comprises a rotary shaft drive for a rotary shaft B, by means of which the first tool carrier 62 can be rotated around an axis which is aligned transverse to the spindle axes and in parallel with the direction Y2 or transverse to the direction X2. In this context, the turret heads 62A and 62B are arranged in such a way that the turret axes are aligned transverse with respect to the rotary shaft B. Further, the turret heads 62A and 62B are arranged on the first tool carrier 62 on faces which are respectively opposed with respect to the rotary shaft B.

The machine tool also comprises a second tool carrier slide 51 arranged on the first tool carrier face WTS1 of the first carrier portion 1a, a second tool carrier 61 being arranged on said second tool carrier slide, and a third tool carrier slide 53 positioned on the second tool carrier face WTS2 of the second carrier portion 1b, a third tool carrier 63 being positioned on said third tool carrier slide.

The second and third tool carriers 61 and 63 are in this embodiment formed as tool turrets which each comprise a turret head carrying tools and mounted rotatably around a turret axis aligned in parallel with the spindle axes. However, instead of a tool turret, it is also possible to provide a milling/drilling spindle, for example, with a tool mount for the second and/or third tool carrier 61, 63. Further expedient embodiments of the invention are possible in which the second and/or third tool carrier is also formed like the first tool carrier 62 according to the invention with two turret heads 62A and 62B.

Figure 3:
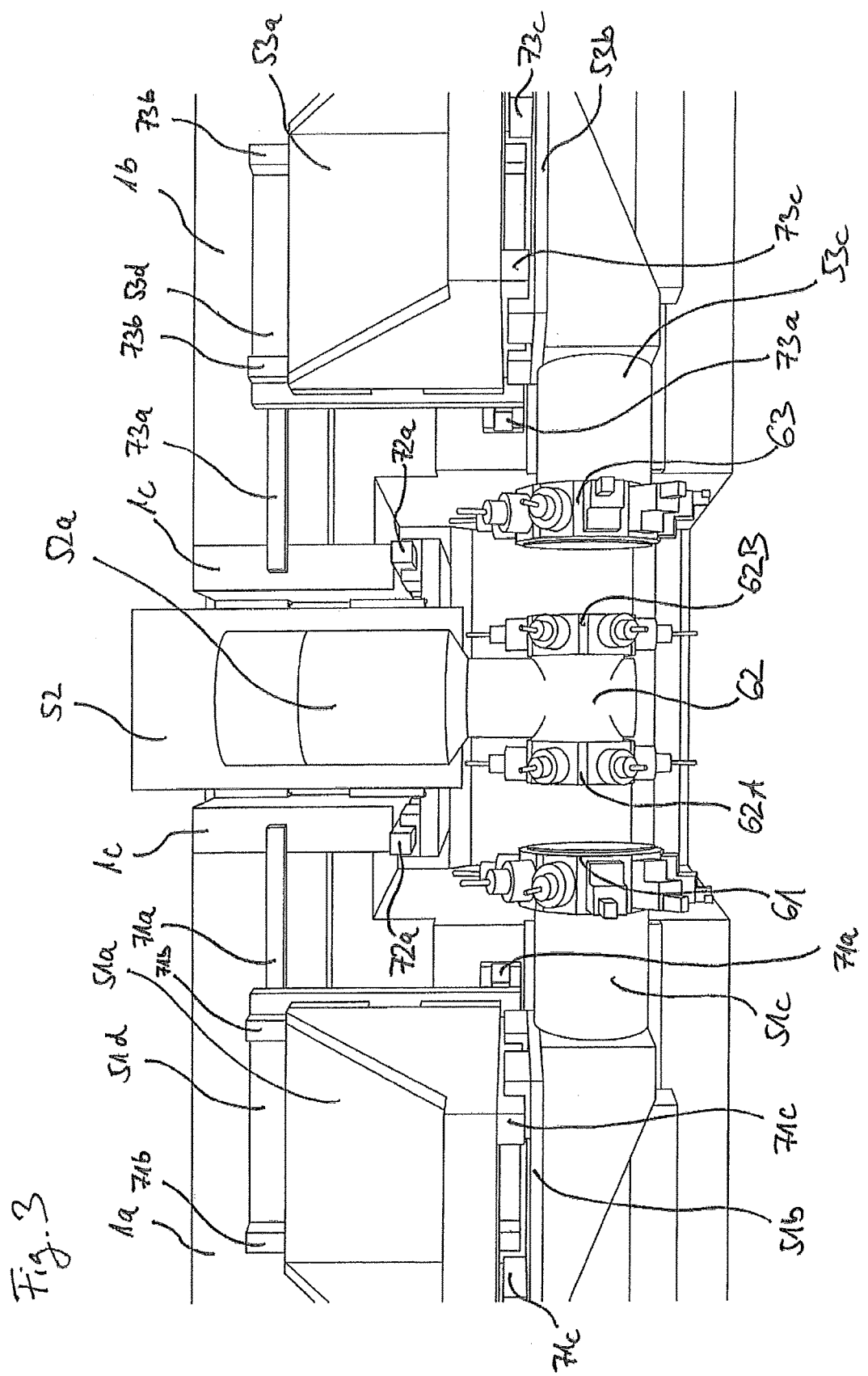
FIG. 3 is an exemplary schematic plan view of the machine tool in accordance with the preferred embodiment of the present invention from FIG. 2.

FIG. 3 is an exemplary plan view of the machine tool according to the preferred embodiment of the present invention from FIG. 2. In this context, in particular the structure of the tool carrier slides is shown in even more detail in 51 and 52.

The second tool carrier slide 51 is designed as a double compound slide comprising three part-slides 51d, 51a and 51b, the part-slide 51d being arranged on the first carrier portion 1a of the machine frame 1 and guided on guides 71a which are arranged in parallel with the spindle axes on the first tool carrier face WTS1 of the first carrier portion 1a. The part-slide 51d is thus displaceable in a direction Z1 (see also FIG. 2). Guides 71b are arranged on the part-slide 51d, which extend transverse to the spindle axes and on which the part-slide 51a is displaceably guided in direction Y1 (see also FIG. 2). Guides 71c are arranged on the part-slide 51a, which extend transverse to the spindle axes and transverse to direction Y1 of the guides 71b and on which the part-slide 51b is displaceably guided in direction X1 (see also FIG. 2). Finally, a housing 51c is held on the part-slide 51b, extends into the machining space parallel to the spindle axes, and has the second tool carrier 61 held at its end. As a result of this construction, the second tool carrier 61 can be displaced in three orthogonal directions X1, Y1 and Z1.

In accordance with this embodiment, the third tool carrier slide 53 is also configured as a double compound slide comprising three part-slides 53d, 53a and 53b, the part-slide 53d being arranged on the second carrier portion 1b of the machine frame 1 and being guided on guides 73a which are arranged in parallel with the spindle axes on the second tool carrier face WTS2 of the second carrier portion 1b. The part-slide 53d is thus displaceable in a direction Z3 (see also FIG. 2). Guides 73b are arranged on the part-slide 53d, which extend transverse to the spindle axes and on which the part slide 53a is displaceably guided in direction Y3 (see also FIG. 2). Guides 73c are arranged on the part-slide 53a, which extend transverse to the spindle axes and transverse to the direction Y3 of the guides 73b and on which the part-slide 53b is displaceably guided in the direction X3 (see also FIG. 2). Finally, a housing 53c is held on the part-slide 53b, extends into the machining space parallel to the spindle axe and has the third tool carrier 63 held at its end. As a result of this construction, the third tool carrier 63 can be moved in three orthogonal directions X3, Y3 and Z3.

Figure 4:
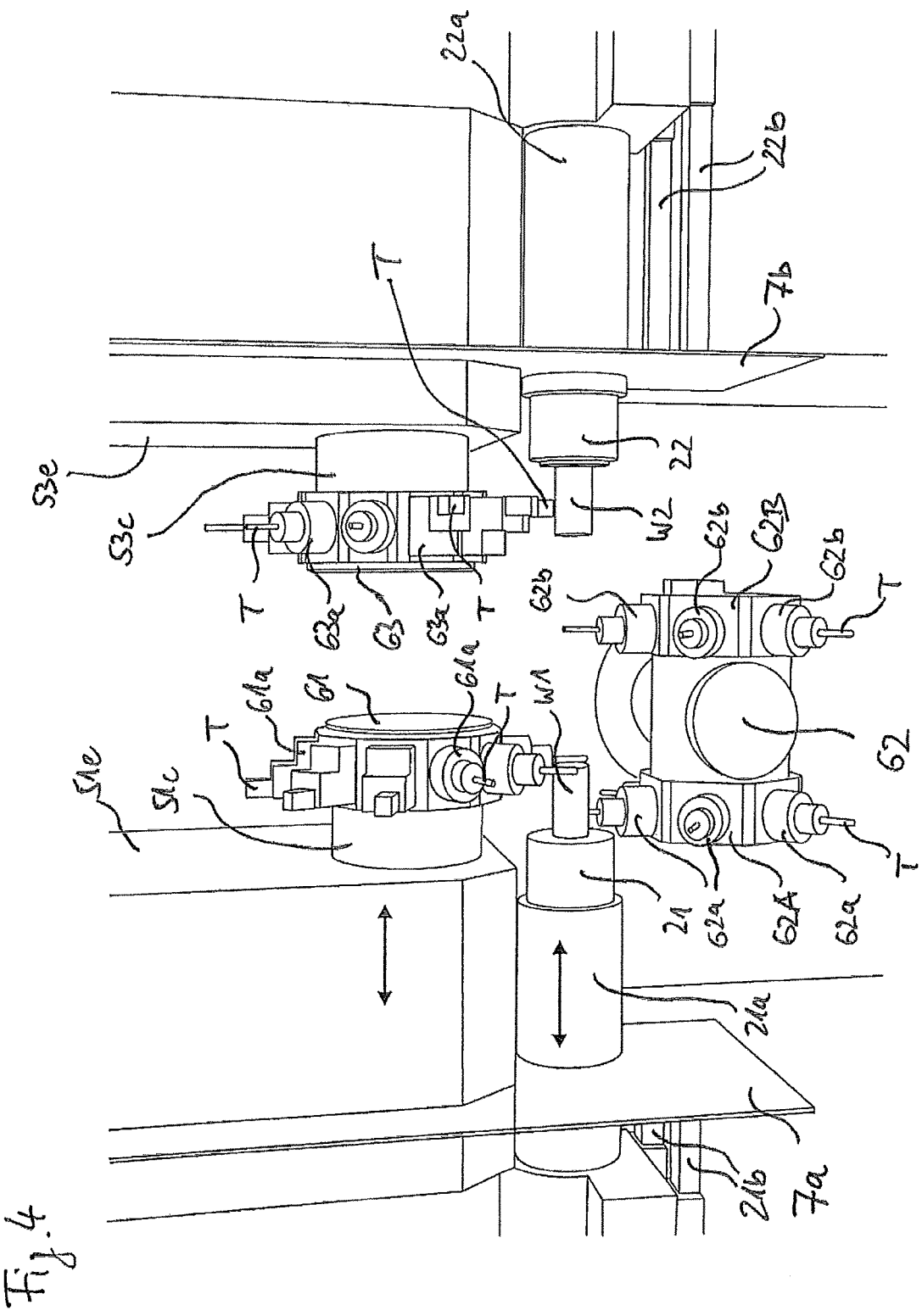
FIG. 4 is an exemplary schematic detail of the machining space of the machine tool in accordance with the preferred embodiment of the present invention from FIG. 2.

FIG. 4 is an exemplary schematic detail of the machining space of the machine tool in accordance with the preferred embodiment of the present invention from in FIGS. 2 and 3.

As already described above, in this embodiment the second and third tool carriers are in the form of tool turrets having respective turret heads 61 and 63. In this context, the turret heads 61 and 63 are aligned in such a way that the turret axes are aligned mutually parallel and parallel with the spindle axes. A plurality of tool holders 61a are arranged on the turret head 61 of the second tool carrier circumferentially around the turret axis, and are each set up to hold tools T for machining a workpiece.

By rotating the turret head 61 around the turret axis, the respective tool holders 61a can be aligned with the first work spindle 21, so as to machine a workpiece W1 held therein. A drive for the tool turret may be arranged in the housing 51c. Analogously, a plurality of tool holders 63a are arranged on the turret head 63 of the third tool carrier circumferentially around the turret axis, and are each set up to hold tools T for machining a workpiece. By rotating the turret head 63 around the turret axis, the respective tool holders 63a can be aligned with the second work spindle 22, so as to machine a workpiece W2 held therein. A drive for the tool turret may be arranged in the housing 53c.

A plurality of tool holders 62a are arranged on the turret head 62A of the first tool carrier circumferentially around the turret axis, and are each set up to hold tools T for machining a workpiece. By rotating the turret head 62A around the turret axis, the respective tool holders 62a can be aligned with the first work spindle 21 (or else with the second work spindle 22) so as to machine a workpiece W1 or W2 held therein.

In FIG. 4 a tool on the tool turret 62A is by way of example aligned with the first work spindle 21, in such a way that the workpiece W1 held therein can be machined both by a tool on the tool turret 62A and also simultaneously by a tool on the tool turret 61. At the same time, a workpiece W2 held on the second work spindle 22 can be machined by a tool on the tool turret 63.

A plurality of tool holders 62b are arranged on the turret head 62B of the first tool carrier 62 circumferentially around the turret axis, and are each set up to hold tools T for machining a workpiece. By rotating the turret head 62b around the turret axis, the respective tool holders 62b can be aligned with the second work spindle 22 (or else with the first work spindle 21) so as to machine a workpiece W2 or W1 held therein.

For example, the second work spindle 22 in FIG. 4 can be displaced further into the machining space together with the tool carrier 63 in such a way that, by means of the tool carrier 62, the workpiece W1 held on the first work spindle 21 can be machined using a tool on the tool turret 62A and the workpiece W2 held on the second work spindle 22 can also be machined using a tool from the tool turret 62B simultaneously. In this way, it is advantageously even possible to machine two workpieces W1 and W2 using a construction having only three compactly arranged tool carriers 61, 62 and 63 on only three compact slide systems 51, 52 and 53 simultaneously in a wide variety of configurations with two tools in each case.

For this purpose, this embodiment is also expedient and advantageous specifically because a respective double degree of freedom of displacement parallel to the spindle axes is provided for each spindle. Specifically, both the second tool carrier 61 and the first work spindle 21 as well as the third tool carrier 63 and the second work spindle 22 can each be displaced in a direction parallel to the spindle axes mutually independently (see for example the two arrows in FIG. 4 for spindle 22 and tool carrier 61, or directions $Z_{MS}$ and Z1 or $Z_{CS}$ and Z3 in FIG. 2).

In this way, the relative positioning, in the direction of the spindle axes, between the workpiece W1 on the first work spindle 21 and a tool on the turret 62A of the first tool carrier 62 can be controlled by means of the $Z_{MS}$ displaceability of the spindle 21, whilst the relative positioning, in the direction of the spindle axes, between the workpiece W1 on the first work spindle 21 and a tool on the second tool carrier 61 can be controlled by means of the Z1 displaceability of the second tool carrier 61.

Analogously, the relative positioning, in the direction of the spindle axes, between the workpiece W2 on the second work spindle 22 and a tool on the turret 62B of the first tool carrier 62 can be controlled by means of the $Z_{CS}$ displaceability of the spindle 22, whilst the relative positioning, in the direction of the spindle axes, between the workpiece W2 on the second work spindle 22 and a tool on the third tool carrier 63 can be controlled by means of the Z3 displaceability of the third tool carrier 63.

FIG. 5 is a further exemplary schematic detail of the machining space of the machine tool in accordance with the preferred embodiment of the present invention from FIG. 2. In this drawing, a workpiece W is received on the two work spindles 21 and 22 simultaneously and a tool from the second tool carrier 61 can be used to split the workpiece W into workpieces W1 and W2, which are subsequently received on the first and second work spindle 21 and 22 respectively and can be machined mutually independently, for example in accordance with the configuration from FIG. 4. FIG. 5 shows by way of example optional additional coverings 51a and 53e which can be used for covering the tool carrier slides 51 and 53 and protecting them from chips.

FIGS. 6A to 6D are further exemplary schematic details of the machining space of the machine tool in accordance with the preferred embodiment of the present invention from FIG. 2, illustrating the many ways in which the first tool carrier 62 can be orientated.

In this context, the particularly expedient design of the first tool carrier 62 in this embodiment of the present invention is evident. In this context, the arrangement according to FIG. 6A substantially corresponds to the arrangement according to FIG. 4. As a result, as disclosed above, the two workpieces W1 and W2 can each be machined simultaneously on the respective work spindles 21 and 22 by means of two tools from the tool carrier 62, in each case by one tool from turret 62A and one tool from turret 62B.

Figure 6B:
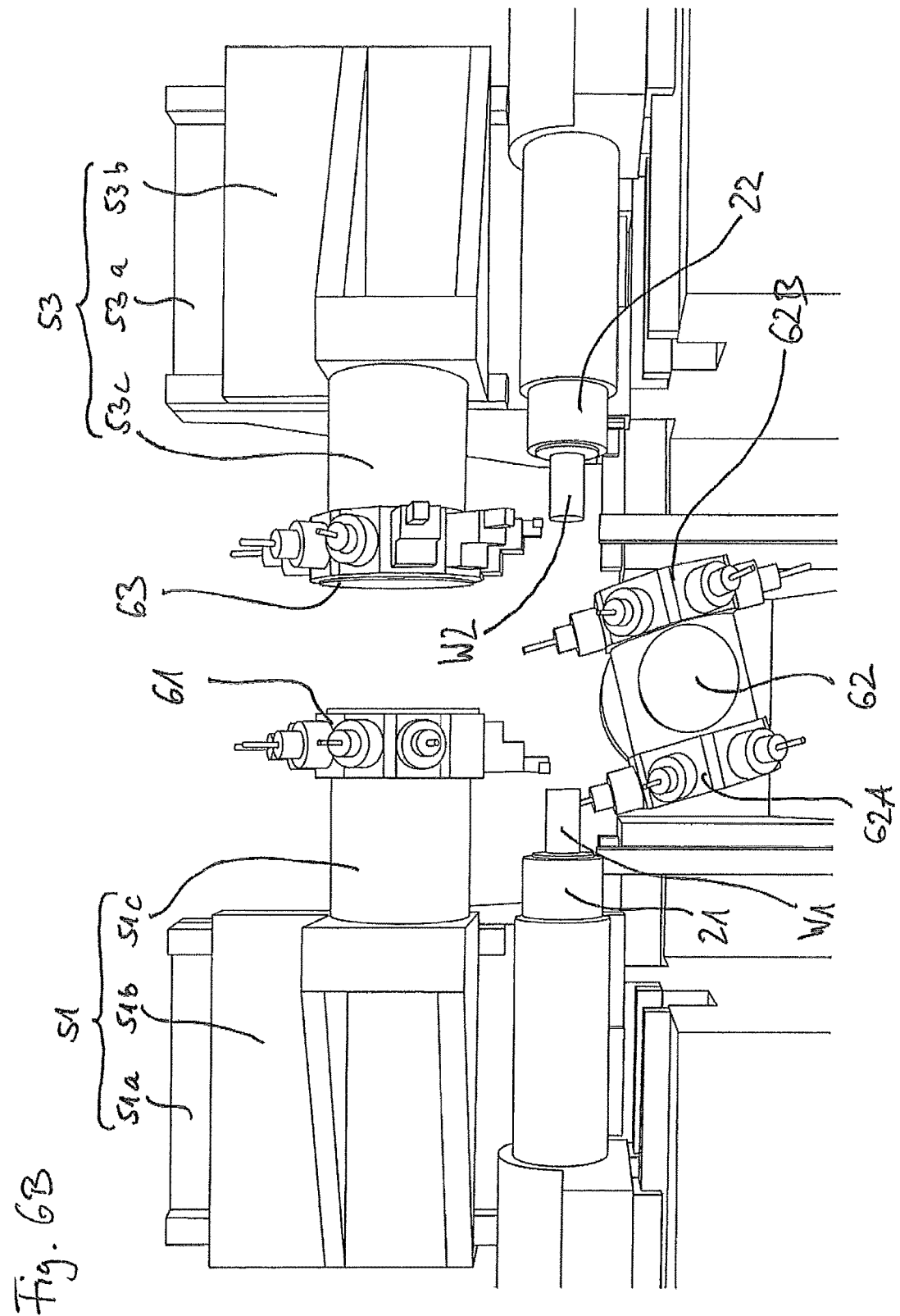
Figure 6E:
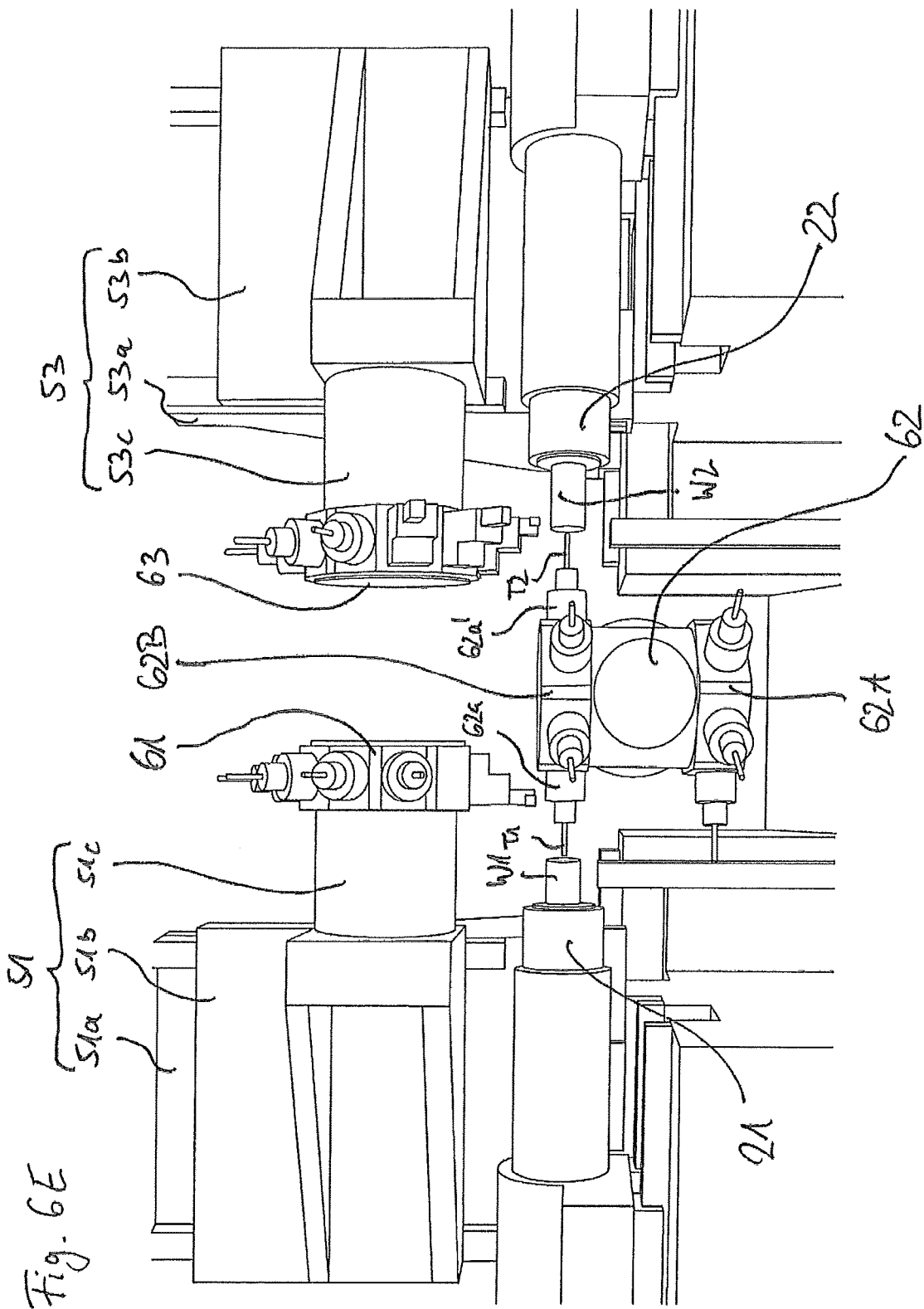

As a result of the advantageous embodiment of the tool carrier 62 having two coaxially arranged turret heads 62A and 62B on opposite sides of the rotary shaft B of the tool carrier 62, the turret axis of the turret heads 62A and 62B can be rotated with respect to the alignment of the spindle axes in such a way that it is possible to transition virtually continuously from radial machining of the workpiece W1 in accordance with FIG. 6A by means of a tool T from the turret head 62A to axial machining of the workpiece W1 in accordance with FIG. 6E by means of a tool T1 from the turret head 62B.

In this context, the orientation of the turret axes of the turrets 62A and 62B with respect to the spindle axes is by way of example 0° in FIG. 6A, 15° in FIG. 6B, 45° in FIG. 6C, 75° in FIG. 6D and finally 90° in FIG. 6E. In this context, by way of example, between the orientations shown in accordance with FIG. 6C and FIG. 6D, there was a change from machining using a tool from the tool turret 62A to machining using a tool from the tool turret 62B by displacing the tool carrier downwards in direction X2, so as to give the tool carriers 61 and 63 more space for machining. These would otherwise have to be displaced upwards in direction X1 or X3 and would no longer be able to be involved in machining the workpieces W1 and W2.

FIG. 6E further shows that the embodiment of the first tool carrier 62, in accordance with which the turret axis of the workpiece turret 62B (or 62A) can be aligned transverse to the spindle axes, has the further advantage that the workpieces W1 and W2 held on the two work spindles 21 and 22 can further be machined simultaneously in the axial direction by tools T1 and T2 from the turret 62B of the first tool carrier 62.

In particular, the first tool turret head 62A and the second tool turret head 62B in each case comprise a plurality of mounts for receiving tool-holding tool holders 62a or 62b, and both tool turret heads 62A and 62B are set up to align a mount by rotating the respective tool turret head 62A or 62B around the turret axis with a workpiece mounted on one of the work spindles. In this context, the mounts are in each case arranged in pairs on opposite faces on the respective tool turret head 62A or 62B with respect to the first turret axis in such a way that one mount can be aligned with the second work spindle 22 in each case, by another opposite mount being able to be aligned with the first work spindle 21 if the turret axis is aligned transverse, in particular perpendicular, to the spindle axes, as shown by way of example in FIG. 6E for the second turret head 62B.

In addition, the tool carrier 62 is set up to align a mount for the first tool turret head 62A with the workpiece W1 received on the first work spindle 21, by aligning a mount for the second tool turret head 62B with the workpiece W2 received on the second work spindle 22 if the turret axis is aligned parallel to the spindle axes, as shown in FIG. 6A by way of example.

According to this particularly expedient embodiment, in accordance with FIG. 6A, a first arrangement can thus be provided, in which the turret axes of the tool turrets 62A and 62B are aligned in parallel with the spindle axes of the work spindles 21 and 22, and the workpiece W1 which is received on the first work spindle 21 can be machined radially using a tool from the tool turret 62A, whilst the workpiece W2 received on the second work spindle 22 can simultaneously be machined radially using a tool from the tool turret 62B, and further, in accordance with FIG. 6E, a second arrangement can be provided, in which the turret axes of the tool turrets 62A and 62B are aligned transverse to the spindle axes of the work spindles 21 and 22, and the workpiece W1 received on the first work spindle 21 can be machined using a tool T1 from the tool turret 62B, whilst the workpiece W2 received on the second work spindle 22 can be machined using a tool T2 from the tool turret 62B, arranged in a position opposite the tool T1 on the tool turret 62B.

Figure 7:
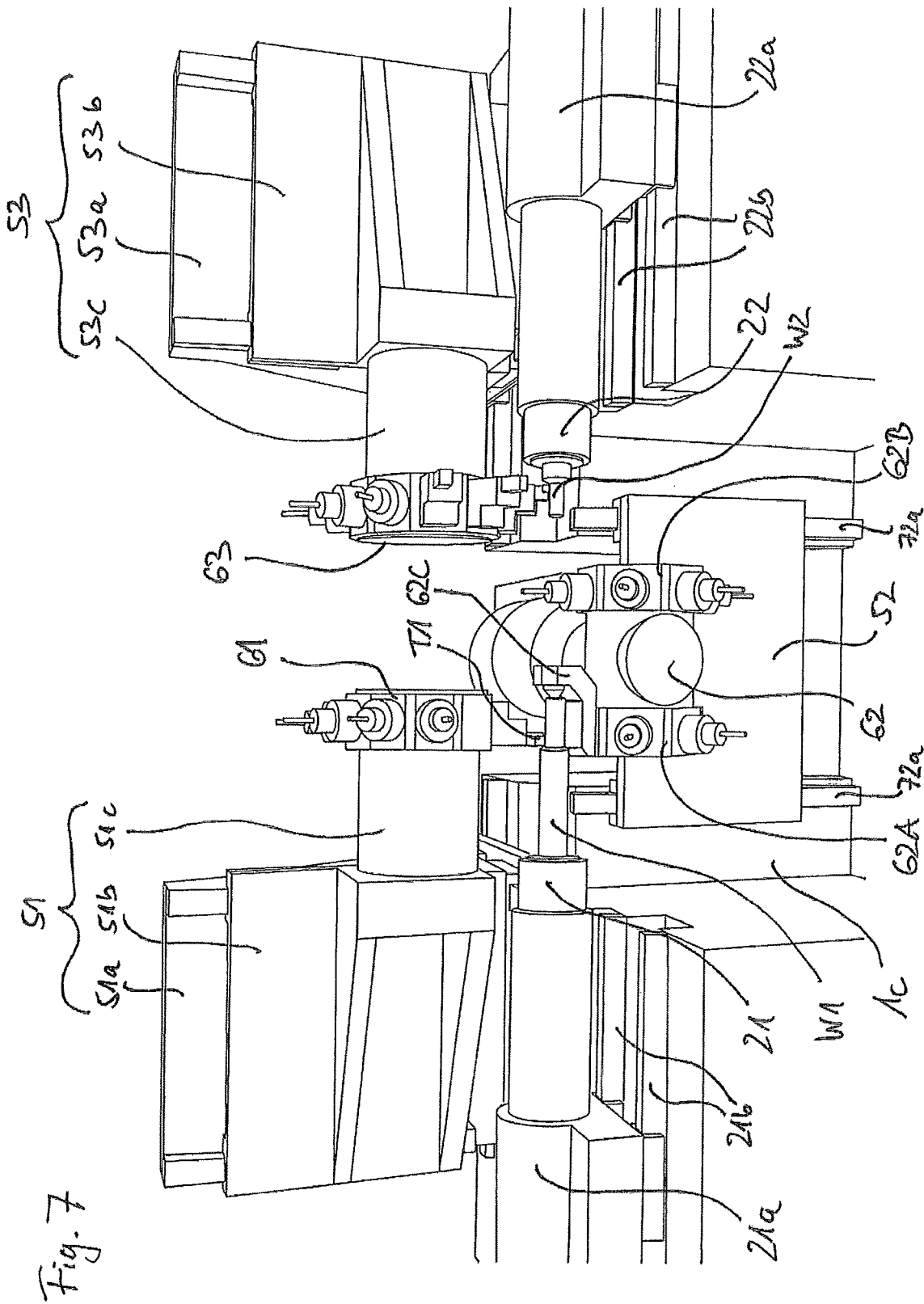
FIG. 7 is a further exemplary schematic detail of the machining space of the machine tool in accordance with the preferred embodiment of the present invention from FIG. 2 in connection with a tail-stock application.

FIG. 7 is a further exemplary schematic detail of the machining space of the machine tool in accordance with the preferred embodiment of the present invention from FIG. 2 in connection with a tail-stock application.

In this context, a tail-stock 62C, having a centring tip by means of which an elongate workpiece received on the first work spindle 21 is centred and held so as not to be bent under the pressure applied by the machining tool T1 from the third tool carrier 61, is arranged on a mount of the tool turret 62A.

Simultaneously, in this arrangement a further workpiece W2 on the second work spindle 22 may also advantageously be machined using a tool from the third tool carrier 63. By bringing the spindle 22 and the tool carrier 63 further into the machining space, the workpiece W2 can further additionally be machined simultaneously by a tool from the tool turret 62B.

In summary, the present invention makes it possible to improve a tool carrier or a machine tool of the generic type in such a way that it is possible to machine the workpieces efficiently, with as many tools as possible, which have the maximum capacity for simultaneous use, with the maximum possible flexibility in the control of the relative movements between the tools and the tools held in the work spindles, together with a compact construction of the machine tool.

The invention claimed is:

1. A machine tool comprising:
a machine frame;
a first work spindle arranged on the machine frame for receiving a first workpiece;
a second work spindle facing the first work spindle and arranged on the machine frame for receiving a second workpiece, the spindle axis of the second work spindle being aligned coaxially with respect to the spindle axis of the first work spindle; and
a first tool carrier arranged on the machine frame between the first work spindle and the second work spindle, the first tool carrier comprising:
a numerically controllable rotary shaft for rotating the first tool carrier,
a first tool turret head carrying tools, mounted rotatably around a first turret axis, and
a second tool turret head carrying tools, mounted rotatably around a second turret axis,
the first tool turret head and the second tool turret head being arranged on opposite sides of the tool carrier with respect to the axis of rotation of the rotary shaft,
wherein the first turret axis is aligned parallel or coaxially with the second turret axis,
wherein the first turret axis of the first tool turret head and the second turret axis of the second tool turret head are aligned transverse to the axis of rotation of the rotary shaft, and
wherein the rotary shaft of the first tool carrier is aligned transverse or perpendicular to the spindle axis of the first work spindle.

2. The machine tool of claim 1 wherein:
the first tool carrier is set up to align a tool held on the tool carrier with a first workpiece received on the first work spindle in order to machine the workpiece.

3. The machine tool of claim 1 wherein:
the turret axes of the first and second tool turret heads can be aligned transverse to the spindle axis of the first work spindle by rotating the first tool carrier around the rotary shaft,
the turret axes of the first and second tool turret heads can be aligned in parallel with the spindle axis of the first work spindle by rotating the first tool carrier around the rotary shaft, and/or
the turret axes of the first and second tool turret heads can be aligned at any angle with respect to the spindle axis of the first work spindle by rotating the first tool carrier around the rotary shaft.

4. The machine tool of claim 2, further comprising:
a first tool carrier slide arranged on the machine frame, and on which the first tool carrier is arranged,
the first tool carrier slide being displaceable in a first direction transverse to the spindle axis of the first work spindle.

5. The machine tool of claim 1 wherein:
the first tool turret head comprises a plurality of mounts for receiving tools or tool holders holding tools,
the first tool carrier being set up to align a mount for the first tool turret head with a workpiece received on one of the work spindles by rotating the first tool turret head around the first turret axis,
the mounts being in each case arranged in pairs on opposite sides on the first tool turret head with respect to the first turret axis such that one mount can be aligned with the second work spindle in each case, another opposite mount being aligned with the first work spindle when the first turret axis is aligned transverse to the spindle axes.

6. The machine tool of claim 5 wherein:
a mount for the first tool turret head can be aligned with a workpiece received on the first work spindle by aligning a mount for the second tool turret head with a workpiece received on the second work spindle if at least one of the first and second turret axes is aligned in parallel with the spindle axes.

7. The machine tool of claim 1 wherein:
the second tool turret head comprises a plurality of mounts for receiving tools or tool holders holding tools,
the first tool carrier being set up to align a mount for the second tool turret head with a workpiece received on one of the work spindles by rotating the second tool turret head around the second turret axis,
the mounts being in each case arranged in pairs on opposite sides on the second tool turret head with respect to the second turret axis such that one mount can be aligned with the first work spindle in each case, another opposite mount being aligned with the second work spindle when the second turret axis is aligned transverse to the spindle axes.

8. The machine tool of claim 2 wherein:
the machine frame comprises a first carrier portion having a first tool carrier face, a second carrier portion having a second tool carrier face and a central portion arranged between the first and second carrier portions, which comprises a third tool carrier face,
the first tool carrier face of the first carrier portion and the second tool carrier face of the second carrier portion being arranged on the same first face of the machine frame, and the third tool carrier face of the central portion being arranged on a second face of the machine frame positioned substantially perpendicularly or obliquely with respect to the first face of the machine frame.

9. The machine tool of claim 8 wherein the first work spindle is arranged on the first carrier portion and the second work spindle is arranged on the second carrier portion.

10. The machine tool of claim 8 wherein a first tool carrier slide which is displaceable transverse to the spindle axes is arranged on the third tool carrier face of the central portion, the first tool carrier being arranged on the first tool carrier slide.

11. The machine tool of claim 10 wherein the central portion comprises a recess between a first and a second guide, a housing for the rotary shaft of the first tool carrier extending into said recess.

12. The machine tool of claim 11 wherein the second and/or third tool carrier can be displaced in a first direction transverse to the spindle axes, in a second direction transverse to the first direction and transverse to the spindle axes, and/or in a third direction parallel with the spindle axes.

13. The machine tool of claim 8, further comprising:
a second tool carrier slide arranged on the first tool carrier face of the first carrier portion, a second tool carrier being arranged on the said second tool carrier slide; and/or
a third tool carrier slide arranged on the second tool carrier face of the second carrier portion, a third tool carrier being arranged on the said third tool carrier slide,
the second and/or third tool carrier slide being displaceable in parallel with or transverse to the spindle axes.

14. The machine tool of claim 12 wherein the second and/or third tool carrier is formed as a tool turret which comprises a turret head carrying tools, and is received such that it rotates around a turret axis aligned in parallel with the spindle axes.

15. The machine tool of claim 8 wherein the first tool carrier face of the first carrier portion and the second tool carrier face of the second carrier portion substantially span a first plane, and the third tool carrier face of the central portion substantially spans a second plane aligned perpendicular to or obliquely with respect to the first plane.

16. The machine tool of claim 15 wherein the second plane is indented towards the machine frame with respect to the second face of the first and second carrier portions of the machine frame.

\* \* \* \* \*